United States Patent
Gross et al.

[15] 3,689,139
[45] Sept. 5, 1972

[54] OPTICAL PROJECTOR

[72] Inventors: Alexander Gross; Ilene Astrahan Gross, both of 18, Redcliffe Square, S.W. 10, London, England

[22] Filed: Sept. 22, 1969

[21] Appl. No.: 859,741

[30] Foreign Application Priority Data

Oct. 3, 1968 Great Britain..........46,986/68

[52] U.S. Cl. .................................................353/84
[51] Int. Cl. ..............................................G03b 21/14
[58] Field of Search ........353/1, 2, 84; 240/3.1, 10.1; 40/130, 132, 106.53; 350/4–7

[56] References Cited

UNITED STATES PATENTS

| | | | |
|---|---|---|---|
| 2,757,570 | 8/1956 | Molnar | 353/2 |
| 1,174,930 | 3/1916 | Frey | 240/3.1 |
| 1,498,064 | 6/1924 | Apfelbaum | 353/1 |
| 1,739,478 | 12/1929 | Bielecki | 240/3.1 |
| 2,553,005 | 5/1951 | Regan | 353/2 |
| 3,358,556 | 12/1967 | Brown | 353/2 |

FOREIGN PATENTS OR APPLICATIONS

| | | | |
|---|---|---|---|
| 7,610 | 1905 | Great Britain | 353/2 |
| 426,269 | 4/1935 | Great Britain | 240/3.1 |
| 703,924 | 2/1954 | Great Britain | 40/106.21 |

*Primary Examiner*—Harry N. Haroian
*Attorney*—Nolte and Nolte

[57] ABSTRACT

An optical projector in which the light beam is projected from a light source through a lens system and a slide onto a screen, the slide having two light-transmitting walls containing two or more immiscible fluids, at least one fluid being colored and at least one of the walls of the slide being flexible so that interplay between flexible wall and the fluids causes relative motion between the fluids, this slide being supported in a slide carrier means which are arranged to be moved, either rotated around an axis or reciprocated, by movable means so that the light beam projects different parts of the slide into the screen to give changing colored images.

4 Claims, 8 Drawing Figures

PATENTED SEP 5 1972

INVENTOR
ALEXANDER GROSS ET AL
BY Holman, Blascuk,
Downing & Seibold
ATTORNEYS

PATENTED SEP 5 1972 3,689,139
SHEET 3 OF 3
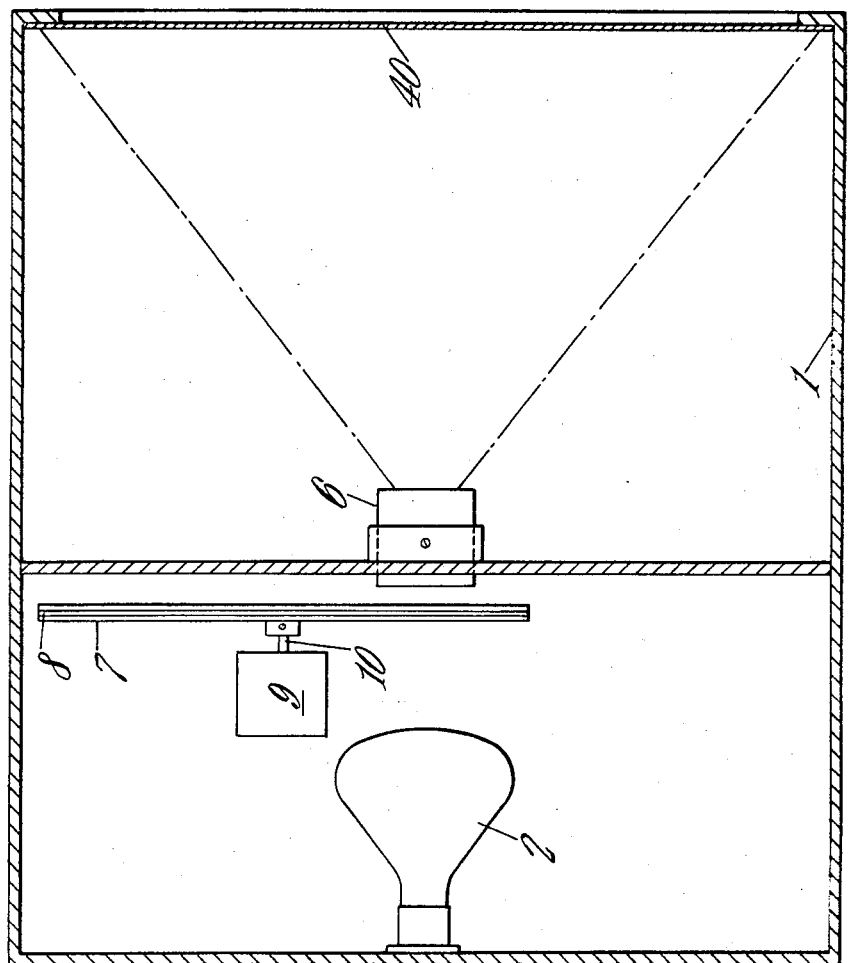
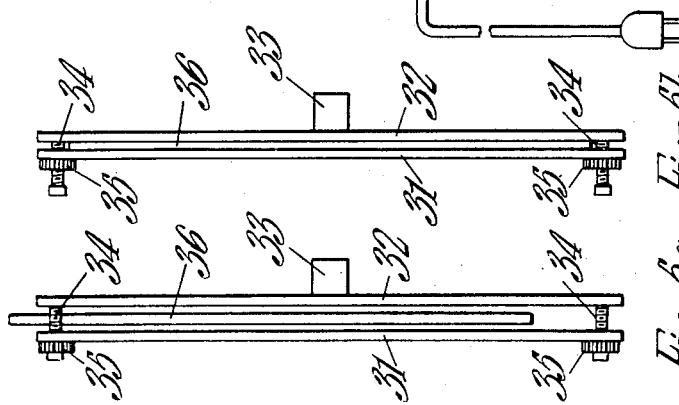
Fig.5a.  Fig.5b.  Fig.6.
INVENTOR
ALEXANDER GROSS ET AL
BY Holman, Glascock,
Downing & Seebold
ATTORNEYS

OPTICAL PROJECTOR

This invention relates to an optical projector.

Reference is made to my copending U.S. application Ser. No. 750,533, filed Aug. 6, 1968, now abandoned and superseded by a continuation thereof, Ser. No. 102,118, filed Dec. 28, 1970 now abandoned, directed to a slide for a projector.

The invention consists in an optical projector including a light source, a means for projecting a light beam from the light source along a path onto a screen or other surface, slide carrier means for supporting a slide in the path of the light beam, this slide having two light-transmitting walls containing two or more immiscible fluids, at least one fluid being colored and at least one of the walls being flexible so that the fluids are moved when the flexible wall is deformed and movable means for moving the slide carrier means so that the slide is moved whilst the light beam is projecting a part of the slide onto the screen or other surface.

Preferably the slide carrier means include two light-transmitting walls and securement means for holding the two walls together to embrace the slide and the movable means includes a motor arranged to rotate the slide carrier means.

Preferably the movable means is arranged to move the slide carrier means in a closed path or reciprocating linear path.

An absolutely regular reciprocating path, e.g. 40° each side of a central rest position would be uninteresting aesthetically as the movement of the liquids would become predictable and therefore uninteresting. An irregular reciprocating path, i.e. 30° right, 45° left or 17° right, 38° left etc, would make the movement of liquids less predictable and more interesting.

Preferably the slide carrier is arranged to hold the slide fixedly therein but it is possible for the slide carrier to be arranged to allow the slide to move relative to the slide carrier as the slide carrier is moved.

Figure 7:
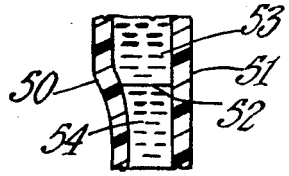
Figure 4A:
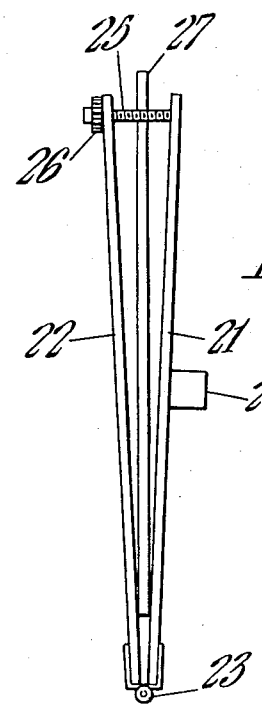

FIGS. 4a and b show another example of a slide carrier in the open and closed positions respectively;

FIGS. 5a and b show another example of a slide carrier in the opened and closed positions respectively;

FIG. 6 is a horizontal section of a diagram showing another example having a translucent screen and FIG. 7 is a detail of a part of a slide in cross section.

Figure 1:
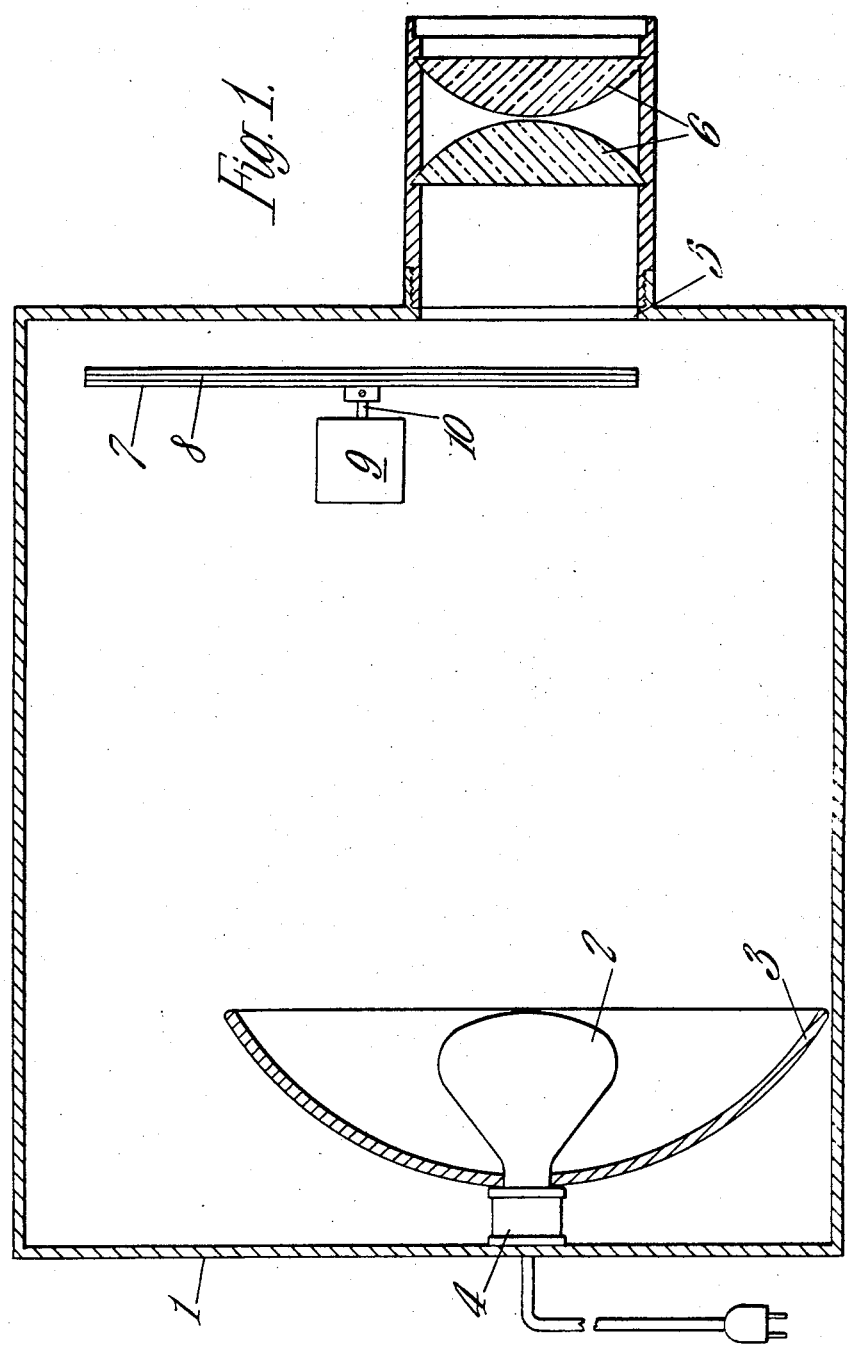
FIG. 1 shows a diagrammatic horizontal section of the first example.

In FIG. 1 there is shown a projector casing 1 containing a lamp bulb 2 mounted within a parabolic reflector 3 and connected to a lamp bulb socket 4 connected to casing 1. An aperture 5 leads to objective lenses 6 which condense light rays from bulb 2 for projection onto a screen not shown. A slide carrier 7 carries a particular new form of projector slide 8 and is connected to an electric motor 9 so as to be rotated around the connecting shaft 10. As an optional extra an adjustable mirror might be provided to reflect the projected light beam and to control the deflection of the light beam and therefore the form of the projected images. It will be seen that, as the motor 9 rotates slide carrier 7, different parts of the slide 8 are moved through the projector light beam and this creates one form of motion of the projected image.

The slide 8 is made from two parallel light-transmitting walls containing two or more immiscible fluids where at least one of the fluids is colored or both fluids have different colors so that images are projected onto the screen having movable shape or contour as the two immiscible fluids move relative to each other. At least one of the walls of the slide 8 is flexible so that this flexible wall can deform to assist in the motion of the immiscible fluids contained in the slide. It will be seen that the projector is particularly suitable for these slides since the motion of the slide carrier will cause the immiscible fluids to move relative to each other and will generally disturb the distribution of the two fluids in the slide cavity and the flexible wall and thereby cause extensive movement of the colored images projected onto the screen.

Figure 3:
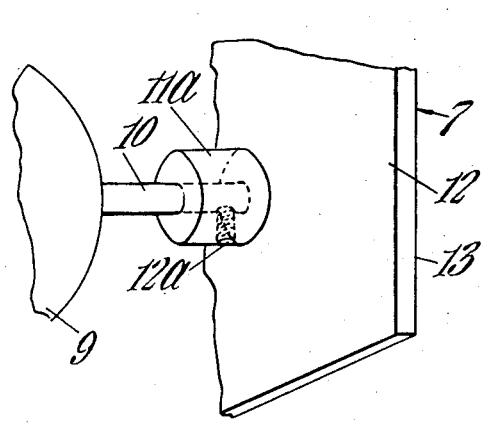
FIG. 3 shows a part of the same detail as shown in FIG. 2.
Figure 2:
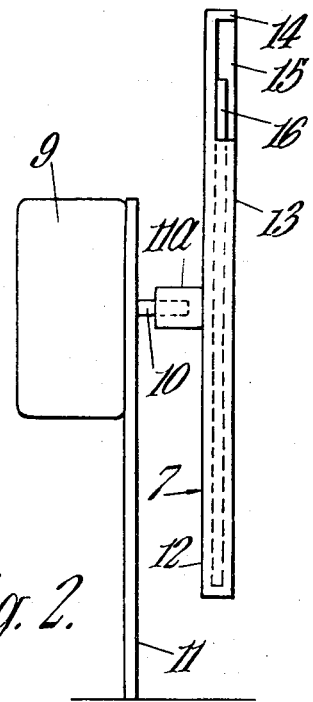
FIG. 2 shows a detail of FIG. 1 in side view.

In FIG. 2 the motor 9 is supported by a transverse panel 11 and rotates driving shaft 10 which is mounted in a bush 11a connected to slide holder 7. In FIG. 3 a screw 12a is screwed into bush 11a to engage a recess in shaft 10 and hold shaft 10 in connection with bush 11a. Bush 11a is rigidly secured to slide carrier 7.

In FIGS. 2 and 3 slide carrier 7 has the form of two parallel rigid walls 12 and 13 connected together along their bottom surface. The front wall 13 has a shorter height than the back wall 12 and the front wall 13 is connected to back wall 12 along its two side edges. The upper edge of back wall 12 is bent over to form an extending upper rim 14 which projects perpendicularly out from back wall 12 to terminate approximately in the plane containing front wall 13 and thereby define a wide slot 15 between rim 14 and the upper edge of front wall 13. The slide 16 can be slipped onto the slide carrier through this slot 15 and, in this particular arrangement of the slide carrier, the slide 16 must have some flexibility to allow it to be slightly bent so as to ease the slide into the slide carrier whereupon it takes up its normal flat shape. As the slide carrier 7 is rotated around the axis of bush 11 the slide 16 will move upwardly to fall against the rim 14 when the slide carrier is upside down and the slide will also move sideways against the side edges of the slide carrier during rotation. This movement will greatly disturb the immiscible fluids as well as change the part of the slide falling in alignment with the projected light beam so that the projected image can be varied. However, we often find it more useful to hold the slide stationary in the slide carrier, for example, by adhesive tape as will be described below.

Clearly the motor can be provided with a switch for variable speed control. Furthermore it is possible to introduce further lenses between the lamp and the slide carrier to assist in focusing the slide onto the screen. It is possible to provide for the slide carrier to be axially movable if necessary. It is also possible for the objective 6 to be adjustable to focus the image.

Alternatively, the slide holder can be connected to a cylinder which is mounted on bearings held within a sleeve supported from the base of the projector by a support wall or rod. This cylinder can have a gear ring arranged to mesh with a further gear ring arranged to be driven by the motor 2 so that the slide carrier is rotated through a different transmission from the motor and it is possible to modify this arrangement so as to allow the slide holder and cylinder to be axially movable for focusing purposes. Or again, a flexible coupling or gear, belts or pulleys can be used as the transmission system between the motor and the slide carrier.

Figure 4B:
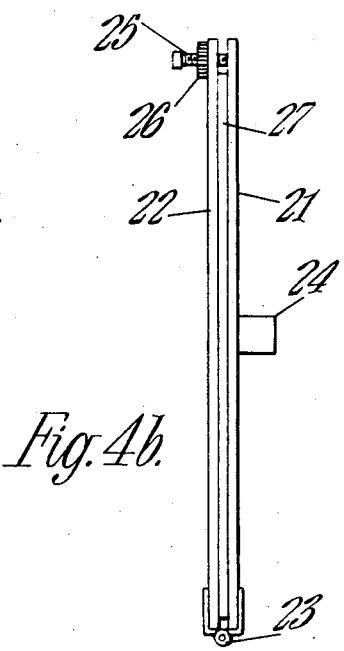

In FIGS. 4a and 4b there is shown the open and closed positions respectively of a slide carrier having two transparent rectangular walls 21 and 22 connected together by a hinge joint 23 along their lower adjacent edges and a bush 24 is rigidly connected to the back wall 21. There is a screw 25 extending through a hole near each top corner of front wall 22 and connected to the back sheet 21. A nut 26 on each screw 25 can be rotated along this screw 25 to push front wall 22 towards back wall 21 and trap a slide 27 between the two walls to hold the slide firmly within the slide carrier and prevent relative motion of the slide 27 in the slide carrier when the slide carrier is rotated around the axis of the bush 24.

In FIGS. 5a and 5b another slide carrier is shown having front and back walls 31 and 32, a bush 33 connected to back wall 32 having a hole to receive the shaft of an electric drive motor. Four screws 34 extend through holes provided near the four corners of the front wall 31 respectively and are connected to the back wall 32. Each screw 34 has a nut 35 which can be moved along the screw 34 so as to move the whole of the front wall 31 towards back wall 32 in a direction perpendicular to the plane of the two walls 31 and 32 to trap a slide 36 within the slide carrier firmly so as to prevent relative motion of the slide as the slide carrier is rotated by the motor.

It is possible for the roof of the projector to be hingedly connected to the projector or removable for access into the projector casing. It is also likely that the projector would include a heat gate in the form of a light transmitting screen situated between the lamp and the slide to protect the slide from excess heat. Holes should be provided in the casing and roof to allow the heat to escape and the use of fans, blowers, and other cooling devices in projectors is already well known.

The slide holder could be rotated by a fan belt drive. Clearly where the slide carrier is to be reciprocated then either the motor can be arranged to give this motion or some form of crank shaft arrangement can be provided to convert the rotary motion from the motor into a reciprocating motion.

It is possible for the motor to be a variable speed motor. It is not always necessary to use condenser lenses to reduce the size of the focused image. It is not always necessary to use a reflector behind the lamp.

It is possible for the motor and some of the transmission system or gear system to be located outside the casing of the projector and it is also possible for the slide carrier to be located outside the casing of the projector or the slide holder can project through slots in the casing and move relative to the casing.

It is possible for the lamp and the motor to be supplied with power from the mains or a battery. It is possible for this projector to be used as a toy by children and the slide carrier can even be movable manually instead of or in addition to being driven by a motor.

Clearly variations of the technical details can be made to this projector and the slide holder can be varied in its structural details.

It is also possible to arrange for the motor speed to be controlled by a control signal from a device which is producing music or other sounds and in which the signal is variable in some manner corresponding to the music or sound, for example the control signal could be varied according to the pitch or amplitude of the music.

It is possible to use a series of timing devices and switches to regulate the motion of the motor.

The slide carrier can be the simple arrangement of two parallel rigid walls which can be six-sided or eight-sided, round or almost any shape. These two walls are held together by an adhesive tape and perpendicular to the light path which is arranged to pass through a small area off-center of the carrier since the center of the carrier is connected to a perpendicular rotary drive shaft from the motor. The slide is correspondingly six- or eight-sided and slightly smaller than the carrier to fit into the carrier and be held therein. As the carrier rotates the area of the slide transmitting the light beam will move round in a circle so that the shapes and colors of the pattern on the screen move off one side of the screen and new patterns appear from the other side. Also due to the motion of the slide and the flexible wall or walls, the shapes are changing shape even as they move across the screen due to the rotation of the carrier. There can be two or more parallel slides held together in the carrier to give a greater variety of images and colors. The slide is just a little smaller than the carrier to ensure light beam passes through a large variation of the shapes of the images and to allow easy relative movement of the fluids so that there is a continual interplay of movements and pressures between fluids and flexible walls.

The screen can be built into a box and made as a rear-projecting translucent screen.

The unit has a variable speed control to hasten and slow the movement of images across the screen and it can reverse this direction. There is also a variable brightness control which can vary the intensity of the lamp.

A first electronic control circuit may be applied to control the speed of the motion so that the speed of the slide increases as the level of the music or other sound changes. A second control circuit, usually known as a sound-to-light circuit, may be used to control the brightness intensity of the lamp proportional to the level of the sound.

Clearly the slide holder and slide could be made as a single integral piece.

The slide (and/or slide holder) could also have a hole in the center so that it could be threaded onto the motor shaft or held by an arbor.

In FIG. 6, similar parts are numbered as in FIG. 1 and the casing 1 now contains the lenses 6 inside the casing and the lenses project the light beam onto the light-transmitting screen 40 which is now supported by the wall of the casing to be viewed from the reverse side.

A speaker can be provided in the casing 1 and this speaker can be fed from a record player, electric guitar, television or other sound signal source.

If the projector unit has the electronic control circuits it can be arranged for the brightness of the light source and for the speed of the motor to be controlled by the electric signals passing to the speaker from the sound signal source.

The slide is illustrated in FIG. 7 and comprises opposed light transmitting walls 50 and 51 at least one of which (in this embodiment, wall 50) is flexible at least in the path of the light beam. In the drawing wall 50 is shown flexed and an interface 52 appears between immiscible fluids 53 and 54.

We claim:

1. In combination, an optical projector and a slide, the optical projector including means defining a light beam path to a screen or other surface, and slide carrier means for supporting a slide in said path, the slide having two opposed, generally parallel light-transmitting walls defining between them a space containing two or more immiscible fluids, at least one of the fluids being colored and being of different appearance from at least one other of the fluids and at least one of the walls being flexible in the path of said light beam so that the flexible wall is deformed when the fluids are disturbed and the optical projector further including movable means for moving the slide carrier means so that the slide is moved causing the fluids to be disturbed and the flexible wall to be disturbed while a part of the slide is projected onto the screen or other surface whereby said flexible wall is constituted as means producing a changing image on said screen.

2. A combination according to claim 1, wherein the movable means is arranged to rotate the slide carrier means so that the light beam describes a circle on the slide as it is rotated.

3. In combination, an optical projector and a slide, the optical projector including a light source, a means for projecting a light beam from the light source along a path onto a screen or other surface, and slide carrier means for supporting a slide in the path of the light beam, the slide having two opposed, generally parallel light-transmitting walls defining between them a space containing two or more immiscible fluids at least one of the fluids being colored and being of different appearance from at least one other of the fluids and at least one of the walls being flexible so that the flexible wall is deformed when the fluids are disturbed and the optical projector further including movable means for moving the slide carrier means so that the slide is moved causing the fluids to be disturbed and the flexible wall to be disturbed while the light beam is projecting a part of the slide onto the screen or other surface whereby said flexible wall is constituted as means producing a changing image on said screen, and wherein the slide carrier means includes two light-transmitting walls and securement means for holding the two walls together to embrace the slide and the movable means includes a motor arranged to rotate the slide carrier means.

4. A combination according to claim 1, including a housing for housing the light source and means for projecting the light beam, this housing including a light-transmitting screen arranged to receive the light beam and be viewed from outside the housing.

* * * * *